United States Patent
Llop

[15] 3,705,311
[45] Dec. 5, 1972

[54] REGULATABLE CONTINUOUS HIGH VOLTAGE GENERATOR

[72] Inventor: Helenio Llop, Creteil, France

[73] Assignee: Societe D'Optique, Precision, Electronique et Mecanique-Sopelem, Paris, France

[22] Filed: Jan. 5, 1971

[21] Appl. No.: 104,096

[30] Foreign Application Priority Data

Jan. 8, 1970 France.................................7000551

[52] U.S. Cl. .........................307/4, 307/26, 307/75, 315/107, 323/62, 328/228
[51] Int. Cl. ..............................................H02j 1/00
[58] Field of Search........307/1, 4, 12, 18, 19, 20, 22, 307/26, 69, 72, 75; 315/107; 323/22 T, 48, 62; 328/228

[56] References Cited

UNITED STATES PATENTS

| | | |
|---|---|---|
| 2,358,902 | 9/1944 | Ziebolz.................................328/228 |
| 3,287,623 | 11/1966 | Valancius...........................323/22 T |
| 3,413,517 | 11/1968 | Barber et al......................315/107 X |

Primary Examiner—A. D. Pellinen
Attorney—Cameron, Kerkam & Sutton

[57] ABSTRACT

A regulatable continuous high voltage generator has a source of alternating voltage with the primary winding of a transformer connected thereto through a variable gain modulator. A first secondary of the transformer is connected through a rectifier and filter to a load receiving the operating voltage. A second secondary of the transformer is connected through a rectifier and filter to a counter reaction circuit which controls the variable gain modulator.

3 Claims, 2 Drawing Figures

PATENTED DEC 5 1972 3,705,311

REGULATABLE CONTINUOUS HIGH VOLTAGE GENERATOR

BACKGROUND OF THE INVENTION

The present invention relates to a regulatable continuous high voltage generator more particularly for control from a distance of a voltage which is to be brought to a high level as, for example, a polarization voltage on the cathode voltage of an electron gun.

Difficulties inherent in the control of high potentials on the order of 75,000 volts are known. Such control requires devices located at a distance from the generator making mechanical control of the potentiometer difficult when brought to high voltage and close control of voltage is not possible because of delay in the mechanisms. Further, if control is carried out by servomotor, auxiliary apparatus of a complex nature is required to obtain precise adjustment of the mechanical position of the servo-motor.

The present invention overcomes these difficulties and provides control by apparatus at low voltage and by totally static means.

SUMMARY OF THE INVENTION

In accordance with the invention, the generator includes a source of alternating voltage, a transformer having two secondary coils, the primary coil being connected to the source of alternating voltage through a variable gain modulator, the first secondary being connected through a first rectifier and a first filter to a first load resistor on the poles of which the operating voltage is supplied, the second secondary being connected through a second rectifier and a second filter to a second load resistor, the characteristic values of each of these secondary coils, resistors, rectifiers, and filters being strictly homothetic respectively with the other coils, resistors, rectifiers and filters and a counter reaction circuit between the second load resistor and the variable gain modulator. In accordance with another embodiment of the present invention for control of a voltage from a distance which voltage is to be brought to a high potential, the first load resistor is disposed in series in a continuous high voltage circuit.

BRIEF DESCRIPTION OF THE DRAWINGS

The present invention will now be described in more detail with reference to a preferred embodiment which is given by way of example and is shown in the accompanying drawings.

In this embodiment of the invention, the invention is used to superimpose a continuous high voltage and a continuous auxiliary voltage controlled from a distance.

Figure 1:
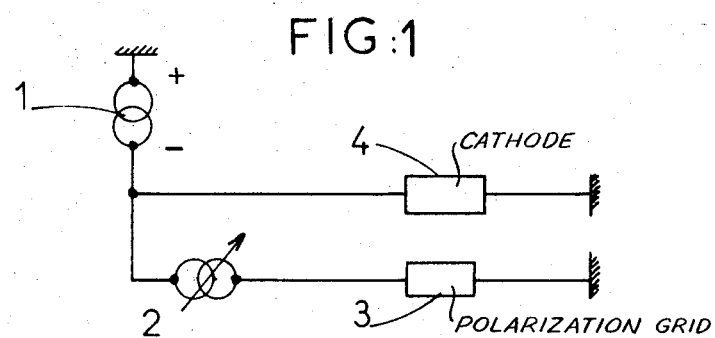
Figure 2:
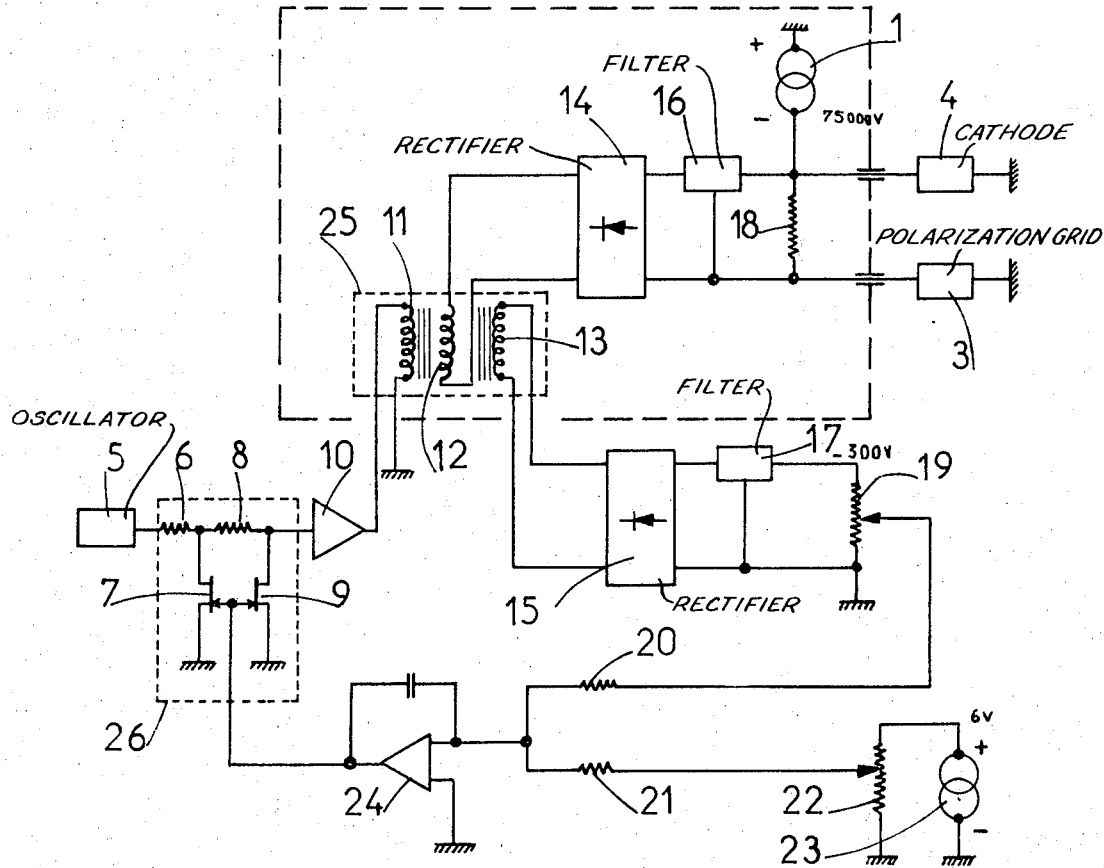

In the accompanying drawings,

FIG. 1 is a schematic diagram showing the general principal of the preferred embodiment used for control of a polarization voltage on the cathode voltage of an electron gun; and FIG. 2 is a detailed circuit diagram of the preferred embodiment of the present invention as generally shown in FIG. 1.

DESCRIPTION OF THE PREFERRED EMBODIMENT

Referring now to FIG. 1, the principal generator of high voltage 1, for example, 75,000 volts, feeds a load 4 which may be the cathode of an electron gun. The second load 3 formed by the polarization grid is fed by the controlled auxiliary generator 2 the voltage output of which is connected in series with that of generator 1. The voltage of auxiliary generator 2, acting through the circuitry, is then connected to the high potential of generator 1.

Referring now to FIG. 2, principal generator 1 producing high voltage is connected directly to load 4 and also connects second load 3 to this high potential. The following description will describe the controlled auxiliary generator which has been broadly shown at 2 in FIG. 1 and which is interconnected between principal generator 1 and load 3.

An oscillator 5 produces a sinusoidal voltage of stable frequency and amplitude which is modulated by a variable gain device 26 as a function of the voltage of a counter-reaction circuit which will be described hereinafter. The modulated voltage is amplified by amplifier 10 and is applied to the primary winding 11 of transformer 25 which has two identical secondary windings 12 and 13.

Secondary winding 12 is connected to the high voltage of generator 1. The alternating secondary voltage from 12 is rectified and filtered by rectifier 14 and filter 16 and is applied to load resistor 18. The continuous voltage appearing at 18 is connected in series with that delivered by generator 1 and their sum is applied to load 3.

Secondary winding 13 is at close to ground potential. The alternating voltage from 13 is rectified and filtered by rectifier 15 and filter 17 and is applied to load resistor 19. A part of the continuous voltage appearing at 19 is utilized as a measure and is compared to a portion of the voltage from generator 23 which is selected by potentiometer 22. Resistances 20 and 21 produce the sum of the voltage appearing at 19 and of the reference voltage appearing at 22. Integrating amplifier 24 produces an amplification of the difference between the measured voltage and the reference voltage, integrates it and controls variable gain modulator 26.

The two secondary windings 12 and 13 of the transformer are identical; the two rectifiers 14 and 15 are identical; the two filters 16 and 17 are identical; and the two resistors 18 and 19 are absolutely identical. The voltage appearing at resistor 19 is therefore constantly identical to that appearing at resistor 18 both in instantaneous value and in its variations.

The variable gain modulator 26 is here made up of two dynamic dividers. The first divider comprises a resistance 6 and a field effect transistor 7 having its source connected to the ground and having its grid controlled. This field effect transistor acts as a variable conductance in function of the grid voltage. The second dynamic divider includes resistance 8 and field effect transistor 9.

The field effect transistors with their sources connected to ground and the grids receive the control voltage from control amplifier 24. They therefore constitute variable conductances either C1 or C2.

Let $Z_1 = 1/C_1$ and $Z_2 = 1/C_2$, be the corresponding impedances of these field effects.

The voltage u delivered by oscillator 5 then equals $u.Z_1/R6+Z_1$ on the output of the first field effect transistor and $U.Z1/R6+Z1 \cdot Z2/R8+Z2$ on the output of the second transistor, that is at the input of amplifier 10. This voltage is then modulated in amplitude by the dividers 26 as a function of the voltage from amplifier 24. The circuits are such that for an increase of voltage appearing at 19 there is a corresponding decrease of the sinusoidal modulated voltage applied at the input of amplifier 10.

The high voltage portion of the installation has been shown enclosed in broken lines in FIG. 2 and it will be seen that the control equipment is at low voltage. Control of the voltage superposed at 18 on the voltage of generator 1 is obtained by adjustment of potentiometer 22. The voltage furnished by generator 23 can be on the order of 6 volts. Potentiometer 22 can be very sensitive and can be located on the control panel of the apparatus without any particular precautions with respect to insulation or distance.

The variable potentiometers 19 and 22 associated with the resistances 20 and 21 provide for a zero voltage at the input of amplifier 24 when the voltage at the terminals of resistance 19 is correct and corresponds to the equilibrium value.

The voltage 300 volts, shown in FIG. 2 at the output of filter 17, is only an approximation and depends in fact on the voltage in the secondary 13 of the transformer.

The variations of voltage in the secondary 13 of the transformer product a disequilibrium of the resulting voltage at the output of resistances 20 and 21 producing an action on modulator 26.

The circuitry of the present invention provides very great stability of the continuous voltage received at load 18 and very fine adjustment since the system is a counter-reaction circuit and a comparison is made between the voltage identical to that which will be utilized and a reference voltage which can be obtained with great accuracy. Source 23 can be, for example, a reference voltage from a Zener diode having great stability and located, if necessary, in an isothermal enclosure to minimize thermal disturbances.

It should be understood that the scope of the invention is not limited by the preferred embodiment described above but extends to other embodiments differing therefrom in detail.

Thus, the secondary windings of the transformer and the associated rectifiers, filters, and resistors, need not be identical each to the other but may be homothetic each to the other by a constant ratio. Further, the functional members could be differently selected. Thus, the dynamic divider bridge should be made up, in known manner, by a resistance and a triode tube in place of the field effect transistor. Amplifier 10 could be variable gain and controlled by a voltage or counter-reaction current and, in this case, the variable gain modulator and the amplifier would then be assembled in a single functional element.

Such apparatus could also be utilized as a controlled continuous simple high voltage generator. In this case, the principal generator 1 and the loads 3 and 4, shown in FIG. 2, would be eliminated and the poles of load resistor 18 would provide the continuous controlled statilized voltage.

I claim:

1. Apparatus for superposing a controlled continuous voltage on a continuous high voltage comprising a source of continuous high voltage, a source of alternating voltage, a transformer, first and second secondary windings for said transformer, a primary winding for said transformer connected to said source of alternating voltage through a variable gain modulator, said first secondary winding being connected through a first rectifier and a first filter to a first resistor to the poles of which is supplied a continuous voltage in series with the voltage produced by said source of continuous high voltage, said second secondary winding being connected through a second rectifier and a second filter to a second resistor, the characteristic values of one of said secondary windings and associated resistor, rectifier, and filter being absolutely homothetic respectively with that of the other of the said secondary windings and corresponding resistor, rectifier and filter, and a counter-reaction circuit including an integrating amplifier receiving a reference voltage and the voltage appearing at said second resistance, the output of said integrating amplifier being connected to said variable gain modulator between said second resistor and said variable gain modulator.

2. Apparatus as described in claim 1, said counter-reaction circuit including means for error integrating.

3. Apparatus as described in claim 1, said variable gain modulator including two dynamic dividers.

* * * * *